United States Patent [19]
O'Brien et al.

[11] 3,818,862
[45] June 25, 1974

[54] PIPE FITTINGS

[76] Inventors: John Leslie O'Brien; Bryan Finnimore; Dallas John Arthur Hogg, all of c/o John L. O'Brien & Associates, 70 Derby St., Auburn, New South Wales, Australia

[22] Filed: Oct. 21, 1971

[21] Appl. No.: 191,244

[52] U.S. Cl............ 118/306, 118/DIG. 10, 118/317, 117/97
[51] Int. Cl............................................. B05b 13/06
[58] Field of Search............ 118/DIG. 10, 105, 306, 118/317, 408; 117/97

[56] References Cited
UNITED STATES PATENTS

| | | | |
|---|---|---|---|
| 2,880,938 | 4/1959 | Stewart et al...................... | 118/317 |
| 3,208,460 | 9/1965 | Heinicke............................ | 118/306 |
| 3,233,580 | 2/1966 | Levake .............................. | 118/317 |
| 3,326,288 | 6/1967 | Pitman.............................. | 118/306 |

*Primary Examiner*—Henry S. Jaudon
*Attorney, Agent, or Firm*—Wenderoth, Lind & Ponack

[57] ABSTRACT

Apparatus for lining pipes or fittings with cement or like material including a tool comprising a disc mounted on a spindle. The tool is rotated and reciprocated in the pipe and cement is fed into the pipe and onto the disc and is thrown onto the pipe walls. The effective disc diameter equals the required pipe lining diameter so that in reciprocating in the pipe the disc edge smooths the lining.

8 Claims, 6 Drawing Figures

PIPE FITTINGS

BACKGROUND OF THE INVENTION

This invention relates to improvements in pipe fittings and in particular to the cement or other lining of such fittings.

As is known in the art, it is common practice to line with cement or other linings almost all metal pipes of say, 3 inches or greater internal diameter to prevent internal corrosion thereof, whether such pipes are intended to convey normally corrosive fluids or whether they are intended to serve merely as water conduits.

Where straight lengths of piping are concerned, such lining has normally been done by centrifugal action, the pipe being rapidly rotated so that a layer of inserted cement or other material is thrown outwardly onto the inner periphery of its wall.

In the case of elbow, Tee, Y or X fittings, pipe bends and other not linear shapes such methods of lining are impracticable and it has hitherto been the practice to apply the lining manually. Such manual methods are slow and accordingly greatly increase the cost of lining such fittings in comparison with the cost of lining straight lengths of pipe.

SUMMARY OF THE INVENTION

The present invention provides means and a method whereby pipe fittings of substantially any shape may be lined mechanically at a greatly increased rate of production as compared with manual methods, and accordingly at a greatly reduced cost. The invention also includes pipe fittings when lined by the above method and apparatus.

Although not confined to such fittings, the invention is particularly useful in the cement lining of fittings for cast iron pipes of the type which are connected together or to straight lengths of piping by the well known spigot joints which consist of the plain end of one pipe or fitting being inserted into an enlarged female end of an adjacent pipe or fitting, the joint being usually rendered fluid tight by such means as pouring molten lead into an annular space between the pipes or fittings at the point of connection or by packing the annular space with lead wool and caulking the joint.

It will be obvious, however, to those skilled in the art that the invention can also be performed on other types of pipe fittings, the essentiality being that it is confined only to such internal diameters of pipe fittings, as may conveniently and economically be lined according to the invention, the major deciding factor in this regard being the cost of tooling in relation to the particular diameter of pipe fittings and the quantities required.

The invention in one form is a tool for lining a pipe or fitting with cement or other suitable material, the tool comprising a spindle, a disc mounted on or near one end of the spindle and a plurality of spaced feeding and packing members mounted on the face of the disc adjacent the major length of the spindle.

The invention further includes a pipe or pipe fitting when lined by the tool or by the method as defined hereabove.

Although the preferred composition for lining the pipes or fittings is a slightly wet friable cement mixture, as known in the art, the mixture per se forms no part of the invention and the invention is accordingly not intended to be limited to any specific composition so long as this is of such a consistency in mixture that it may be applied by the present tool or method.

But in order that the invention may be more clearly understood by those skilled in the art, exemplary forms thereof are described hereunder. It is to be understood, however, that the full scope of the invention is not intended to be limited by any specific terms used for the purpose of this description, but only by such limitations as may necessarily be imposed by the known state of the art.

In particular it is to be understood that the application of the invention is not intended to be limited to any specific type of pipe or pipe fitting, the essential feature of the invention being that the tool of the invention should be capable of being guided centrally of the pipe or pipe fitting, or of the portion thereof, upon which invention is being practiced.

BRIEF DESCRIPTION OF THE DRAWINGS

Preferred forms of the invention are illustrated in the accompanying drawings of which.

DETAILED DESCRIPTION OF THE INVENTION

Figure 1:
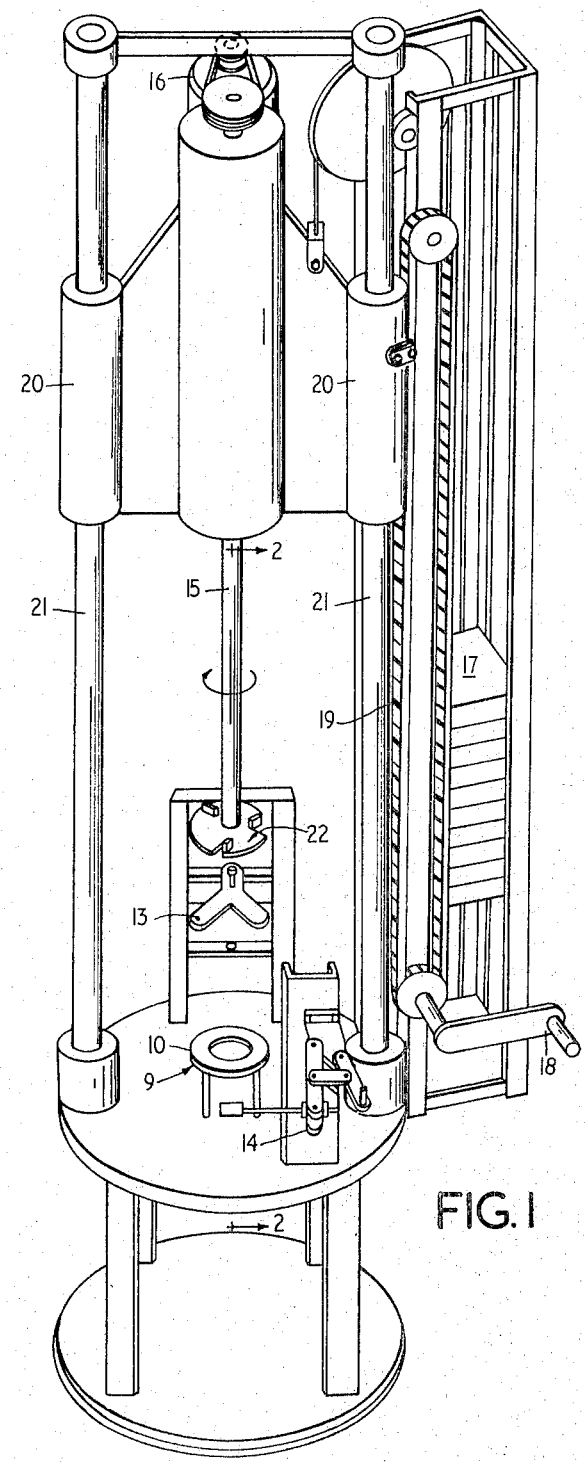
FIG. 1 is a perspective view of one form of a machine for lining pipes which are substantially straight.
Figure 2:
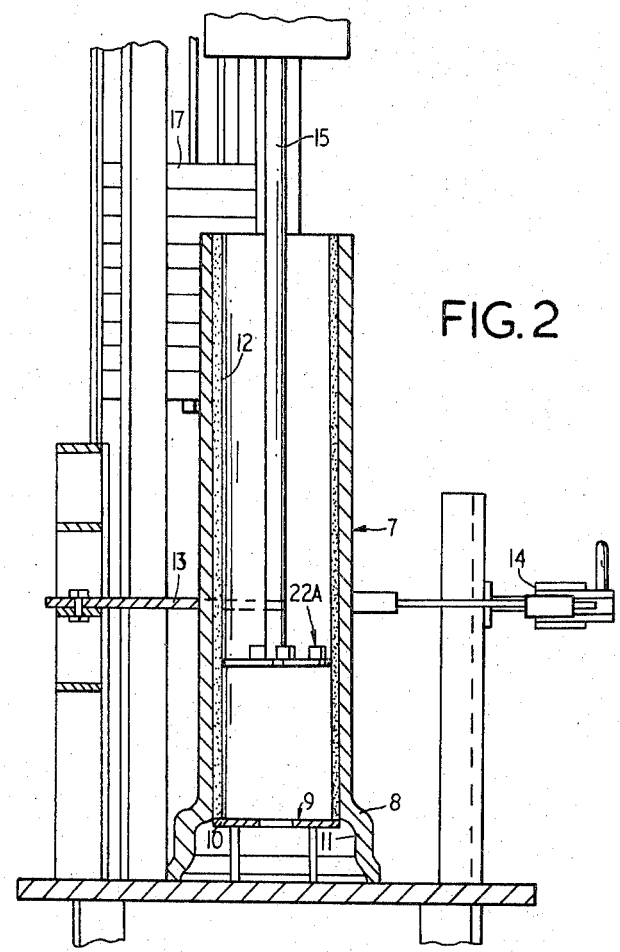
FIG. 2 is a side elevation on the line 2—2 in FIG. 1 showing a pipe in place on the machine.
Figure 3:
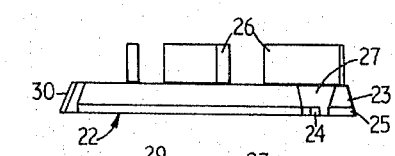
FIG. 3 is a side elevation of a first form of the lining disc associated with the machine shown in FIGS. 1 and 2.
Figure 4:
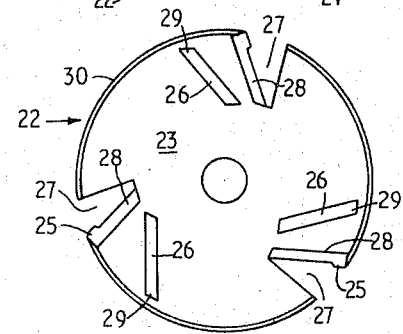
FIG. 4 is a plan view of the lining disc of FIG. 3.

Having the above in mind, one exemplary form of the invention is shown in FIGS. 1 to 4 in relation to a pipe or pipe fitting 7 of short length in comparison with the standard length of a complete straight pipe of the same diameter. Such lengths 7 will vary with the diameter of the pipe, but it may be said as a general principle, that the invention may be applied to substantially any pipe or pipe fitting which, because of its length or form, could not economically or practicably be lined by spinning or centrifugal means.

If the fitting 7 to be lined is a plain spigotted pipe fitting, the enlarged female end 8 of the fitting is placed on a horizontal circular base plate 9 which fits closely within the female end 8 of the pipe fitting 7 and rests with the annular rim 10 between the enlarged portion 11 and the bore of the fitting 7 located on the plate 9 so that the lining composition 12 cannot enter into this enlarged portion 11 and so require subsequent cleaning. If the pipe fitting 7 is of same diameter at each end, i.e., for pipes other than those of the spigot type, the base plate (not shown) may be a flat disc with an annular upstanding rim to snugly encircle the outer periphery of the fitting.

The fitting is locked in this position against rotation by suitable clamping means comprising an adjustable Vee plate 13 and a quick release toggle clamp 14.

Coaxially above the fitting when so secured, is located a rotatable and vertically reciprocable spindle 15 which is rotatable as by an electric motor 16. The spindle is preferably biased to its uppermost position of reciprocation by a suitable counterweight 17 and a handle 18 used to actuate an endless chain 19 raises or lowers the spindle 15 which is maintained in a vertical attitude by guides 20 and guide rods 21 whereby the spindle may be reciprocated.

To the lower end of the spindle 15 is secured the lining tool 22 which consists essentially of a disc 23 having a planar upper surface and a diameter equal to the required diameter of the fitting 7 after it has been lined. The underside of the disc is preferably recessed as at 24 to leave an annular down-turned rim 25 therearound, to prevent the lining composition from packing on the base plate as the tool is moved downwards. This annular rim 25, at its outer periphery, leaves sufficient depth of the disc for it to smooth the applied lining 12, as hereunder described.

Although this is not essential, the tool 22, when rotated by the spindle 15, will preferably rotate in a clockwise direction when viewed from above.

Secured to the upper surface of the disc is a plurality of alternating feeding and packing members 26 and between each feeding member and packing member 26 on the leading side of each feeding member in the direction of rotation, a notch 27 is formed through the disc 23 at its periphery. The notches are preferably of V shape relatively to the plane of the disc 23 and the edge 28 of each notch 27 on the side thereof adjacent the feeding member 26 is upwardly bevelled towards that member.

Although the number of feeding and packing members 26 and notches 27 is not arbitrary, the number used for lining a fitting 7 of 3 inches inside diameter is conveniently three of each. This number may be varied as required, particularly for larger diameter pipe bores, where a greater number than three may be required.

The purpose of the notches 27 and their bevelled edges 28 is to move from the base plate 9 to the top surface of the tool 22 any lining composition 12 which may have been pressed thereunder during downward movement of the tool.

The feeding members 26 are flat plates which are secured to the upper surface of the disc 23 in the form of circumferentially short sections of a helix, and they are upright or are inclined upwardly and outwardly from the axis of the disc 23 and are also inclined upwardly towards the adjacent notch 28 and in opposition to the angle of the bevel thereof. On rotation of the tool 22, lining composition 12 picked up by the notches 27 from the base plate 9 or resting upon the upper surface of the tool 22 is urged radially outwardly towards the inner periphery of the fitting 7.

The radially outer edges 29 of the feeding members 26 also lie substantially above the periphery of the disc 23.

In the operation of the tool 22, the pipe fitting 7 having been located as hereabove described, the tool (whilst stationary against rotation) is lowered into the fitting 7 until it rests on the base plate 9 and a quantity of friable lining composition 12 is placed in the fitting 7. The tool 22 is then rapidly rotated and is slowly reciprocated in the bore of the fitting 7, the feeding members and packing members 26 carrying the lining composition to the periphery of the fitting 7 compacting it into a homogeneous mass. Further lining composition 12 is added as required as the tool 22 is simultaneously being rotated and reciprocated, whilst the periphery 30 of the disc 22 smooths off the surface of the deposited lining 12.

When the operator is satisfied that the lining 12 has been completed, the tool 22 is retracted and the ends of the fitting 7 are cleaned of any "rag" which may have been left.

The saving in time and labour effected by this invention is such that an operator can produce in 1 hour the same number of lined fittings 7 that would have taken him a whole working day to produce by the manual means previously used.

Where branched fittings such as Elbows, Tees, Y's or X's are to be lined, this may also be done in accordance with the invention, merely by placing the fitting in a suitable cradle or jig which can be rotated or adjusted to bring the required branch into line with the tool 22. In such cases, some small amount of manual treatment may be required after the tool has completed its task, but here again the saving in time and labour is considerable in comparison with the previous completely manual lining practice.

As sometimes occurs, a branch in a pipe fitting may be of a different diameter bore than other boxes in the fitting. In such a case, if a batch of the fittings is to be lined, the lining 12 may take place in stages with the bores of one diameter being lined for the whole batch and the tool 22 being changed to line the bores of a different diameter.

Even when the bores are of the same diameter, it may be found of advantage to line, say, all the same branches of a batch before lining other portions of a fitting, thus allowing the lining of one branch to harden before lining another bore and thereby preventing or limiting dislodgment of a previously applied lining by the rotating tool.

Figure 5:
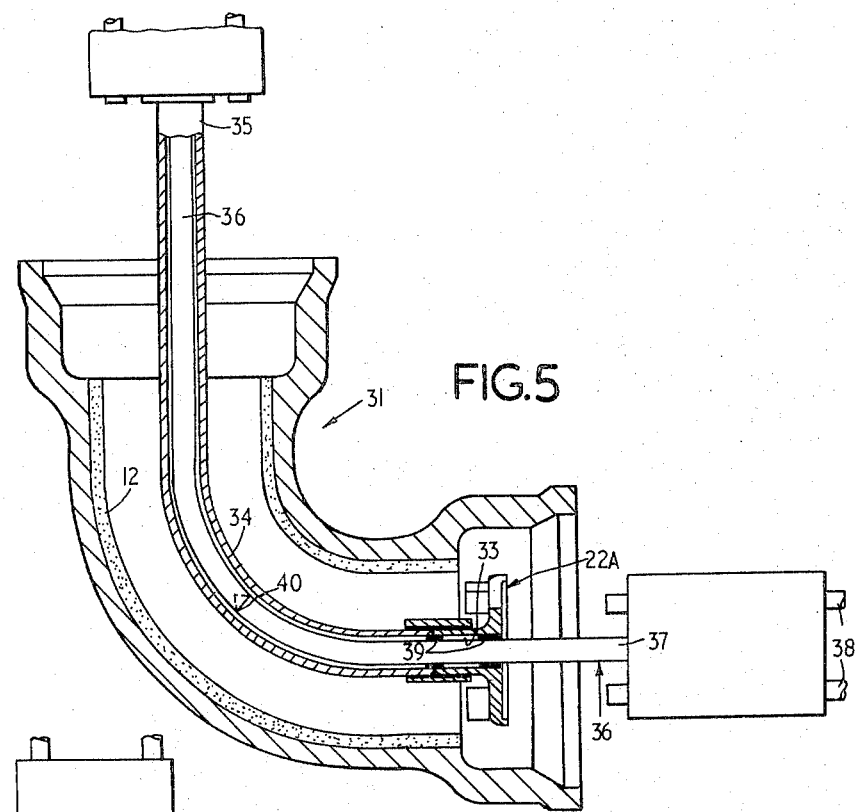
FIG. 5 is an elevation in section of a second form of the invention showing a pipe bend being lined.
Figure 6:
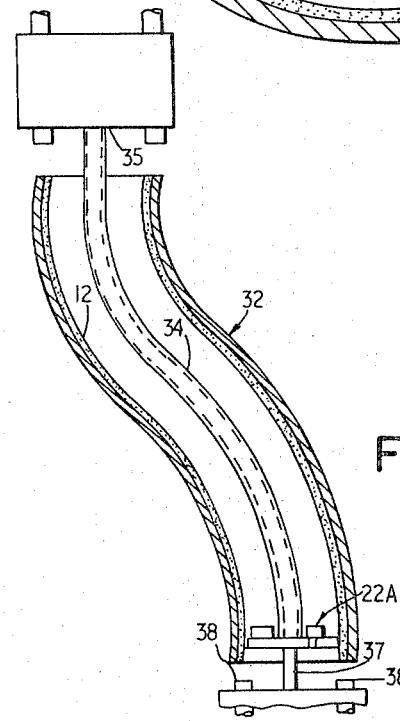
FIG. 6 is an elevation in section of a curvilinear pipe being lined by means of a disc according to a second form of the invention.

In another form of the invention shown in FIGS. 5 and 6, the tool 22A described hereabove may be used for lining pipe bends 31 or any other curvilinear pipes 32 or fittings.

In this case, the disc 22A is annular and is secured at its central opening 33 to a tubular flexible drive 34 which extends through the curvilinear pipe 32 or fitting 31 along its axis of symmetry to the vertically reciprocable spindle 35, to which it is secured.

Within the flexible drive 34 and extending through the annulus 33 is a rigid mandrel 36 having its major length of the same curvature as the pipe 32 or fitting 31, but having its end 37 remote from the reciprocable spindle 35 extending outwards thereof as a straight portion which is firmly secured in two or more spaced apart mandrel supports 38 so that the mandrel 36 is prevented from turning or moving out of its correct alignment. The annulus 33 is provided with bearings 39 which are snugly rotatable around the mandrel.

The same general procedure is used as in lining a straight pipe 7 except that as the tool 22A is reciprocated the flexible drive 34 causes it to follow the curvature of the mandrel 36, with the result that a curvilinear pipe 32 or fitting 31 can be lined by mechanical means more readily and rapidly than has previously been found possible.

In order to facilitate removal of the mandrel 36 from the pipe 32 or fitting 31 after completion of the lining 12, it is preferable to make the mandrel 36 in two parts which are provided with a socketed and spigotted mating joint 40 medially within the pipe or fitting.

What we claim is:

1. An apparatus for lining a pipe with suitable lining magerial, said apparatus comprising:

a tool comprising a spindle, a disc mounted on said spindle adjacent a first end thereof, and a plurality of spaced feeding and packing members mounted on the face of said disc adjacent the major length of said spindle, said spindle and disc being adapted to rotate and reciprocate, the effective diameter of said disc being equal to the required inside diameter of the pipe lining;

means for locating said pipe coaxially with said spindle whereby said spindle and said disc may rotate and reciprocate internally of said pipe; and means for rotating and reciprocating the spindle and disc within said pipe, whilst said lining material is fed into said pipe, thereby causing said material to be disposed by centrifugal force and guided by said members onto the internal wall of said pipe.

2. An apparatus as claimed in claim 1, wherein said spindle is substantially vertical and is adapted to reciprocate vertically.

3. An apparatus as claimed in claim 1, wherein said disc has formed in its rim a plurality of spaced notches, at least one notch being located between each pair of adjacent packing and feeding members, and wherein the spindle is hollow and flexible, the pipe is curved at least for part of its length, and said means for locating said pipe and spindle coaxially include a mandrel extending through said spindle, said mandrel being fixed transversely in relation to the inside of said pipe.

4. A tool for lining a pipe with suitable lining material, said tool comprising:

a spindle;

a disc mounted on said spindle adjacent a first end thereof;

said spindle and disc being adapted to rotate and reciprocate; and a plurality of spaced feeding and packing members mounted on the face of said disc adjacent the major length of said spindle, each of said feeding and packing members comprising an approximately upright plate extending inwardly from a point adjacent the rim of said disc at an acute angle to the radius of said disc.

5. A tool as claimed in claim 4 further comprising a plurality of spaced notches formed in said rim of said disc, at least one notch being located between each pair of adjacent feeding and packing members.

6. A tool as claimed in claim 5, wherein each of said notches has the shape of a V, the edge of each of said notches adjacent one of said feeding and packing members converging upwardly toward said member.

7. A tool as claimed in claim 4, wherein said spindle is a hollow flexible member.

8. A tool as claimed in claim 4, wherein said spindle is a solid member.

* * * * *